May 6, 1924.
E. D. SNEDAKER
WHIFFLETREE
Filed June 15, 1922
1,492,759
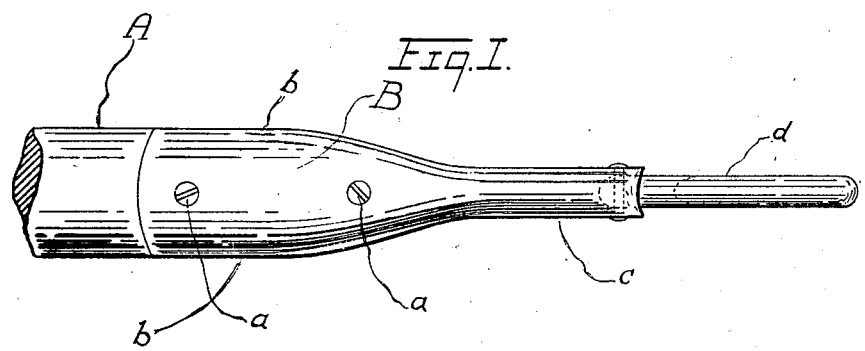
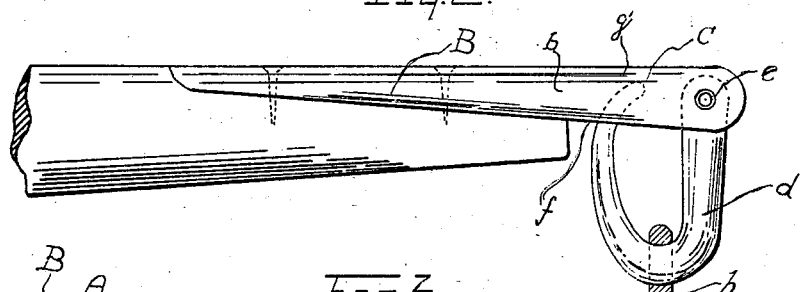
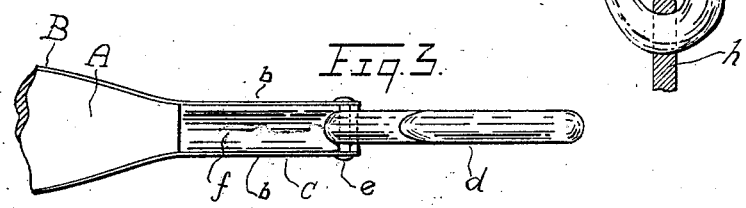
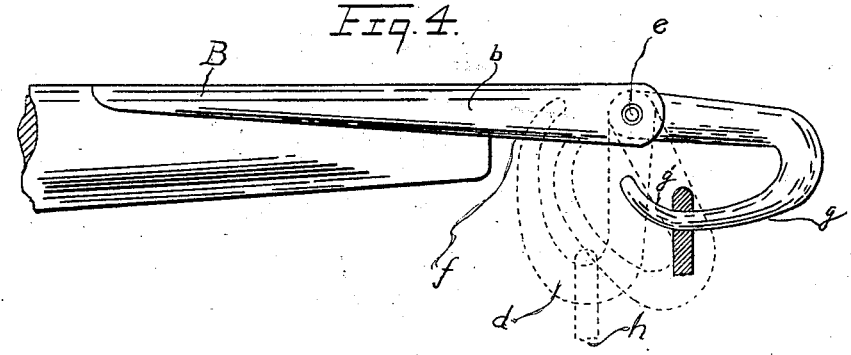
INVENTOR
Elias D. Snedaker
BY
F. N. Gilbert
ATTORNEY Patented May 6, 1924.

1,492,759

UNITED STATES PATENT OFFICE.

ELIAS D. SNEDAKER, OF BINGHAMTON, NEW YORK.

WHIFFLETREE.

Application filed June 15, 1922. Serial No. 568,381.

*To all whom it may concern:*

Be it known that I, ELIAS D. SNEDAKER, a citizen of the United States, residing at Binghamton, in the county of Broome and State of New York, have invented certain new and useful Improvements in Whiffletrees, of which the following is a specification.

My invention relates to an improvement in whiffletrees and whiffletree hooks and it has for its object to provide a whiffletree hook which while permitting the trace eye to be easily hooked over the same, that will itself not permit the trace eye to be easily or accidentally unhooked, when in use. With these objects in view, my invention consists in certain novel features of construction and arrangement of parts as will be hereinafter fully described and pointed out in the claim, reference being had to the accompanying drawings, in which:

Fig. 1 is a bottom plan view of my device.

Fig. 2 is a side view of my device.

Fig. 3 is a top plan view of my device.

Fig. 4 is a side view of my device.

The same reference characters denote like parts in each of the several figures of the drawings.

In carrying out my invention, I provide the usual whiffletree bar A; having a tapering end. On the back surface of the same, I mount by means of the screws $a$, $a$ or in any other convenient manner the hook shank or support B, having the curved sides $b$, $b$ and narrowing down projecting into the elongated neck C forming with its sides, the recess $f$, in the outer end of which and between the sides thereof I mount the pivot $e$. Pivotally mounted on $e$ and in the outer end of recess $f$ I have the hook $d$, which projects into the curved end $g$ and terminating in a slightly curved, tip $g'$; the pivoted hook $d$ being so positioned in recess $f$ that when it is turned at right angles with the shank B, the end of hook $g$ and curved tip $g'$ enters the recess $f$ beyond the end of bar B, forming a closed loop as shown in Fig. 4; in use when I wish to hook on the trace to the whiffletree, I turn back, the hook $d$ out of recess $f$, and hook over the curved tip $g$ the trace eye $h$ and then turn the hook back until the end $g$ is housed within the recess $f$; it is to be noted that from the form and combination of parts of my device, that it is very rarely possible, if at all when in use, for the trace eye $h$ to become unhooked from the hook $d$ for the reason, that in order for this to happen, the hook $d$ must be so turned as to be in an almost completely reversed position and angle with the shank B, which the weight of the trace and eye alone will prevent, and thus the trace remains automatically hooked until released by hand manipulation.

Having thus described my invention, what I claim as new and for which I desire Letters Patent, is as follows:

In a whiffletree; a whiffletree bar having gradually tapering ends and mounted on the back side of each end portion thereof and projecting beyond the end thereof, a trough-shaped support, the sides bent inward to conform to the shape of the whiffletree and beyond the end, extending in an elongated bottle neck form, the sides of the neck flattened and between them, pivotally mounted, a trace hook, having a curved end closing in between the sides of said neck.

In testimony whereof I have affixed my signature.

ELIAS D. SNEDAKER.